United States Patent [19]

Thompson et al.

[11] Patent Number: 5,059,968
[45] Date of Patent: Oct. 22, 1991

[54] RADAR SYSTEM AND METHOD OF OPERATING SUCH SYSTEM

[75] Inventors: Bernard J. Thompson, Concord, Mass.; George R. Spencer, Bedford, N.H.

[73] Assignee: Raytheon Company, Lexington, Mass.

[21] Appl. No.: 626,364

[22] Filed: Dec. 11, 1990

[51] Int. Cl.$^5$ .............................................. G01S 9/22
[52] U.S. Cl. ................................... 342/152; 342/150
[58] Field of Search ......................... 342/150, 152, 149

[56] References Cited

U.S. PATENT DOCUMENTS

| | | | |
|---|---|---|---|
| 3,778,829 | 12/1973 | Longuemare, Jr. et al. | 342/150 |
| 4,331,958 | 5/1982 | Lacomme | 342/152 |
| 4,568,940 | 2/1986 | Diamond | 342/152 |
| 4,789,861 | 12/1988 | Baggett et al. | 342/152 |

*Primary Examiner*—Mark Hellner
*Attorney, Agent, or Firm*—Donald F. Mofford; Richard M. Sharkansky

[57] ABSTRACT

A monopulse receiver includes a monopulse antenna and arithmetic unit for providing a monopulse sum signal, S, an azimuth difference signal, y, and an elevation difference signal, p, an imbalance correction circuit to provide a first composite signal defined as (y+jp) and a second composite signal defined as (y−jp), wherein j is an indicator of being in quadrature with the monopulse sum signal, and for interleaving the first and the second composite signal for providing a composite difference signal, D, and a combiner for providing a third composite signal defined as [S+D] and a fourth composite signal defined as [S−D]. The monopulse receiver further includes a switch matrix, for feeding the third composite signal to a first amplifier channel and for simultaneously feeding the fourth composite signal to a second amplifier channel during a first interval of time and, alternatively, for feeding the third composite signal to the second amplifier channel and for simultaneously feeding the fourth composite signal to the first amplifier channel during a second interval of time to provide an output signal from each of the first and second amplifier channels, and a second switch matrix fed by each output signal from the first and second amplifier channels, to provide successively amplified third composite signals [S+D] at a first output line and successively amplified fourth composite signals [S−D] at a second output line. With this arrangement, the effects of phase and amplitude imbalances in the monopulse antenna and arithmetic circuitry are reduced.

14 Claims, 7 Drawing Sheets

RADAR SYSTEM AND METHOD OF OPERATING SUCH SYSTEM

BACKGROUND OF THE INVENTION

This invention pertains generally to radar systems, and particularly to monopulse receivers of such radar systems.

It is known in the art that a monopulse receiver is used to produce, in response to radar return signals from an illuminated target, target tracking signals. More particularly, in response to such radar return signals, the radar receiver produces a sum signal and a pair of difference signals. One of the pair of difference signals is an azimuth difference signal and the other one of the pair of difference signals is an elevation difference signal. The pair of difference signals are normalized with the sum signal to produce a pair of tracking signals. One of the pair of tracking signals is an azimuth error signal and another one of the pair of tracking signals is an elevation error signal. These tracking signals are also referred to as an azimuth boresight error signal and an elevation boresight error signal.

As it is also known in the art, the sum signal together with the pair of difference signals may be sometimes multiplexed into a single channel, while in other cases a two-channel arrangement is used wherein the pair of difference signals are multiplexed together to produce a multiplexed pair of difference signals. In one of such channels, the multiplexed pair of difference signals are added with the sum signal and in another one of such channels, the multiplexed pair of difference signals are subtracted from the sum signal. In a monopulse receiver of the two-channel type described hereinabove, a so-called "dot-product angle-error-detector circuit" is useful to derive the azimuth and elevation error signals. If the sum signal is combined with the multiplexed pair of difference signals to produce composite signals $(S+D)$ and $(S-D)$ (where S is the monopulse sum signal and D is the multiplexed pair of difference signals), such composite signals may be downshifted to an appropriate I.F. amplifier and applied to a dot-product angle error detector circuit, or equivalent, finally to derive a desired angle error of a target.

Although known single channel or two-channel monopulse receivers may be useful in many circumstances, neither is satisfactory in all applications. For example, when a monopulse receiver is constructed with fewer than the conventional three I.F. signals, the sum and difference signals are combined by some means so that they may be individually retrieved at the output. Thus, the single or two-channel receiver may suffer from cross-coupling between the elevation and azimuth error signals, with a result that the accuracy of a correct determination of the angle error of any target is reduced. With the two-channel I.F. amplifier, satisfactory operation requires that amplitude and phase imbalances between the two channels be limited to very low amounts.

One technique used for reducing imbalances between the two channels is described in patent application, Ser. No. 382,971 having a filing date of July 10, 1989, and entitled "Monopulse Tracking Apparatus and Method of Operating Same" (which patent application is assigned to the same assignee as this application and is incorporated herein by reference). Although useful in many applications for correcting imbalances between the two channels, in other applications such a technique may not provide the requisite correction for amplitude and phase imbalances of a monopulse antenna and for errors introduced by monopulse arithmetic circuitry used to provide the azimuth difference signal and the elevation difference signal which, in turn, cause errors in the tracking signals. Also unacceptable amplitude and phase imbalances between the elevation error signal and the azimuth error signal can be introduced by the circuitry employed to multiplex the azimuth difference signal with the elevation difference signal.

SUMMARY OF THE INVENTION

With the foregoing background in mind, it is an object of this invention to provide an improved two-channel monopulse receiver.

Another object of this invention is to provide a two-channel monopulse receiver wherein effects of amplitude and phase mismatches of a monopulse antenna and errors in the monopulse arithmetic circuitry are reduced.

In accordance with the present invention, a method of operating a monopulse receiver includes the steps of: (a) forming an elevation difference signal, p, and an azimuth difference signal, y, (b) forming, during a first interval of time, a first composite signal comprising the elevation difference signal phase multiplexed with the azimuth difference signal and providing said first composite signal to an output terminal, (c) forming, during a second interval of time following the first interval of time, a second composite signal comprising the elevation difference signal phase multiplexed with the azimuth difference signal delayed in phase by one hundred and eighty degrees and providing said second composite signal to the output terminal, and (d) repeating steps (a), (b) and (c) during successive occurring intervals to provide a composite difference signal.

With this arrangement, a technique is provided for reducing errors introduced by the monopulse antenna and arithmetic unit circuitry in the tracking signals because over an even number of successive occurring intervals errors introduced by the monopulse antenna and arithmetic unit circuitry are effectively cancelled out.

In accordance with a further aspect of the present invention, a monopulse receiver includes means for providing an elevation difference signal, p, and an azimuth difference signal, y and means, fed by the elevation difference signal and the azimuth difference signal, for providing a first composite signal defined as $(p+jy)$, and for providing a second composite signal defined as $(p-jy)$, wherein j is an indication of being in quadrature with the elevation difference signal, and for interleaving the first and the second composite signal for providing a composite difference signal. With this arrangement, effects of antenna segment difference errors and monopulse arithmetic errors are reduced.

In accordance with a further aspect of the present invention, a monopulse receiver includes means for providing a monopulse sum signal, S, an azimuth difference signal, y, and an elevation difference signal, p, and means, fed by the azimuth difference signal and the elevation difference signal, for providing a first composite signal defined as $(y+jp)$ and a second composite signal defined as $(y-jp)$, wherein j is an indicator of being in quadrature with the monopulse sum signal, and for interleaving the first and the second composite signal for providing a composite difference signal, D, and means, fed by the monopulse sum signal and the composite difference signal, for providing a third composite signal defined as [S+D] and a fourth composite signal defined as [S−D]. The monopulse receiver further includes means, responsive to a first control signal, for feeding the third composite signal to a first amplifier channel and for simultaneously feeding the fourth composite signal to a second amplifier channel during a first interval of time and alternatively for feeding the third composite signal to the second amplifier channel and for simultaneously feeding the fourth composite signal to the first amplifier channel during a second interval following the first interval of time for providing an output signal from each of the first and second amplifier channel, and means, responsive to a second control signal and fed by each output signal from the first and second amplifier channels, for providing successively amplified third composite signals [S+D] at a first output line and successively amplified fourth composite signals [S−D] at a second output line. With this arrangement, a two-channel monopulse receiver is provided wherein elevation error and azimuth error signals may be derived simultaneously and continuously while reducing the effects of phase and amplitude imbalances in the monopulse arithmetic circuitry and a four quadrant monopulse antenna.

BRIEF DESCRIPTION OF THE DRAWINGS

For a more complete understanding of this invention, reference is now made to the following description of the accompanying drawings, wherein.

DESCRIPTION OF THE PREFERRED EMBODIMENTS

Figure 1:
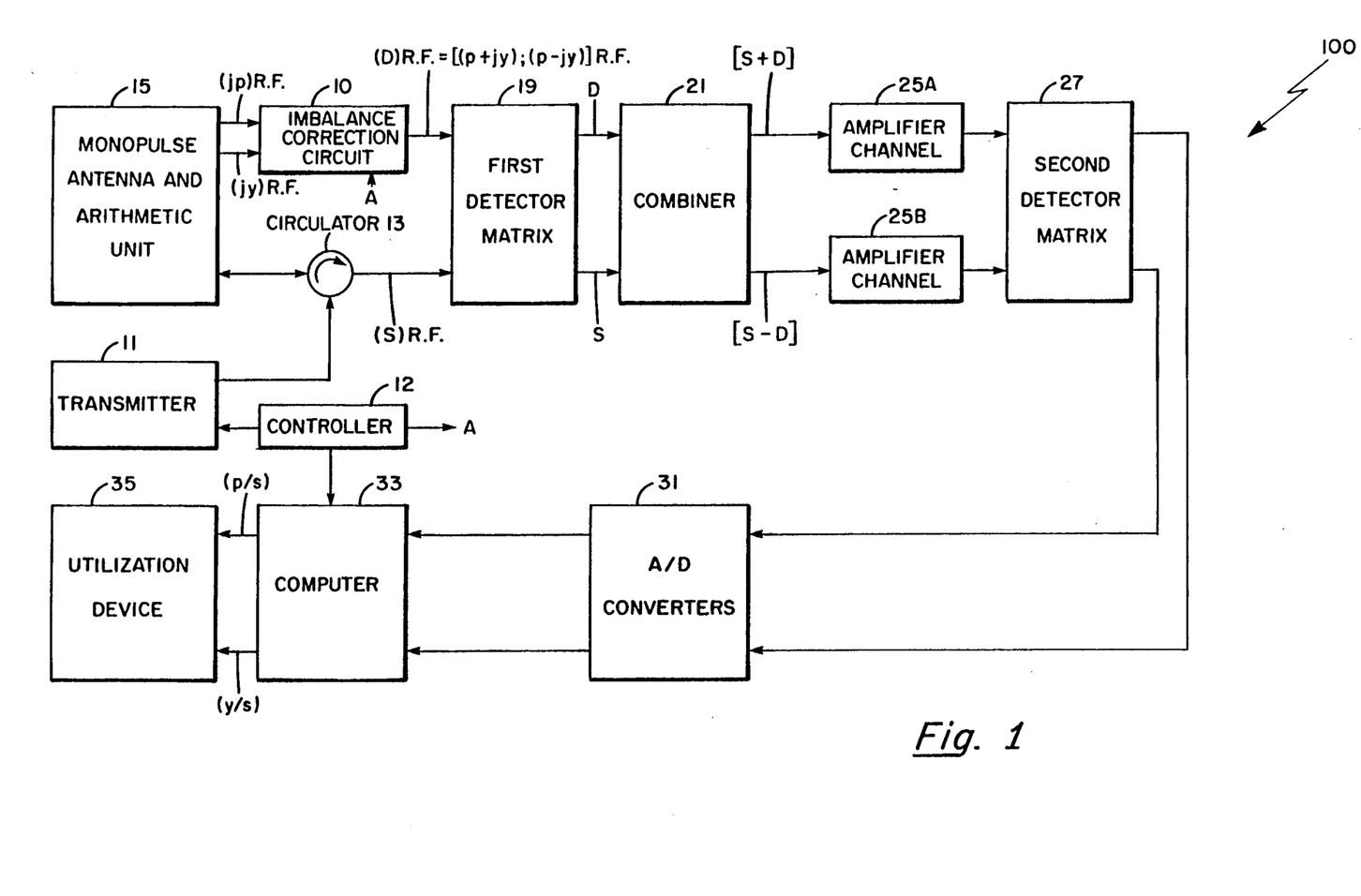
FIG. 1 is a generalized block diagram of a pulse radar incorporating the invention.
Figure 2:
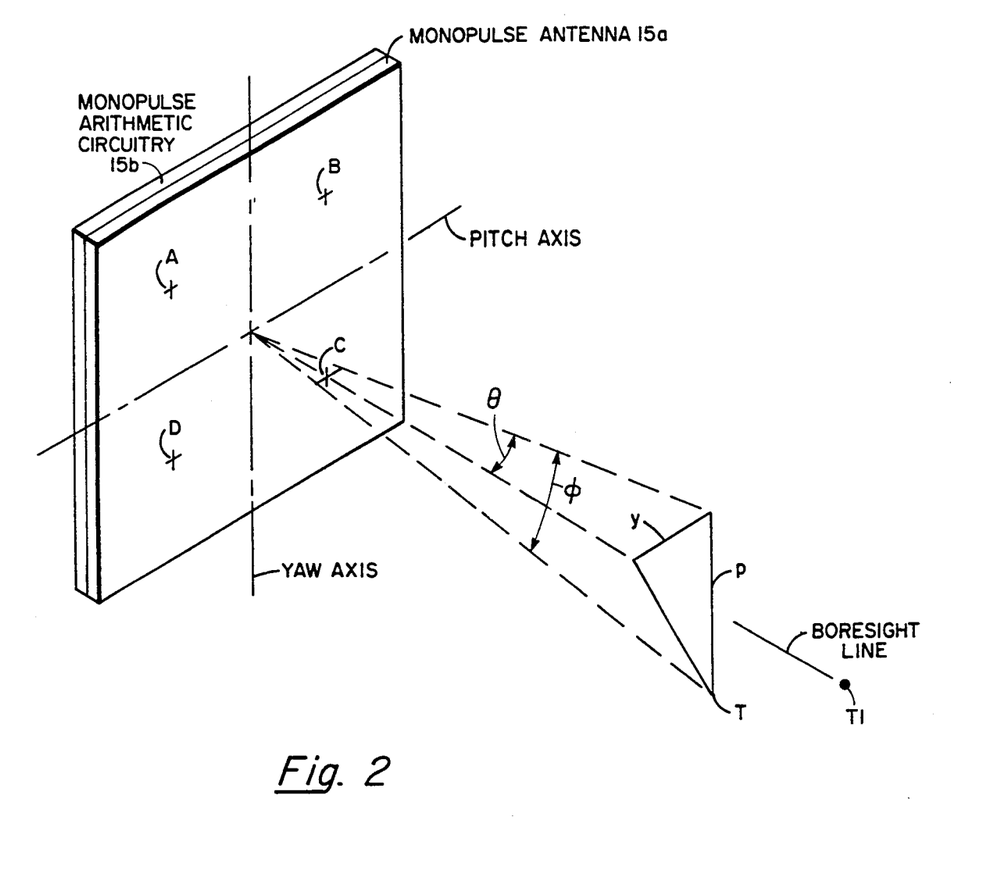
FIG. 2 is a sketch illustrating an exemplary layout of a monopulse antenna showing how monopulse sum, elevation difference and azimuth difference signals may be derived from a target.

Referring now to FIG. 1, a monopulse receiver 100, here a two-channel monopulse receiver, according to this invention is shown. Thus, a transmitter 11 (actuated in response to a trigger signal from a controller 12) is connected, via a circulator 13, to a monopulse antenna and arithmetic unit 15. The just-mentioned elements are conventional in construction to produce, in the monopulse antenna and arithmetic unit 15, a sum beam (not shown) of radio frequency energy, such beam here having a boresight line orthogonal to the aperture of the monopulse antenna as shown in FIG. 2. That aperture, as shown in FIG. 2, here is divided into four equal sectors (or quadrants), each with a phase center A, B, C or D. As is known, the radio frequency (RF) signal in the receive mode at each phase center A, B, C and D is the vectorial sum of the RF signals received by the antenna elements (not shown) in the corresponding quadrant. It will be appreciated, therefore, that (in the receive mode) a monopulse sum signal, S(RF), an elevation difference signal, jp(RF) and an azimuth difference signal jy(RF) derived from a single target and appearing at the various output ports of the illustrated monopulse antenna and arithmetic unit 15 may be described as follows:

$$S(RF) = V_A + V_B + V_C + V_D$$

$$jp(RF) = (V_A + V_B) - (V_C + V_D)$$

$$jy(RF) = (V_A + V_D) - (V_B + V_C)$$

where $V_A$, $V_B$, $V_C$ and $V_D$ each is a vectorial quantity and the operator j is an indicator that the elevation and azimuth difference signals (which also are vectorial quantities) are in quadrature with the monopulse sum signal S(RF) (which also is a vectorial quantity). Thus, even though the phase of each one of the three monopulse signals S(RF), jp(RF) and jy(RF) with respect to any set of reference axes may be unknown, the phase of each one of the elevation and azimuth difference signals, jp(RF) and jy(RF) relative to the monopulse sum signal S(RF) is known to be 90° when the RF energy impinging on the monopulse antenna and arithmetic unit 15 in the receiving mode is from a single source such as "T" in FIG. 2.

Referring to FIG. 2, it should be noted that for a target, T1, on boresight of a monopulse antenna 15a having four quadrants, in an ideal monopulse system, signals from each of the four quadrants of the monopulse antenna 15a would be equal. The signals can be combined in monopulse arithmetic circuitry 15b to yield a sum channel and an azimuth, an elevation and a Q channel. The sum channel would be a maximum and the remaining channels would be zero. In a non-ideal monopulse system having errors, either in the monopulse antenna 15a or in the monopulse arithmetic circuitry 15b, the output of the sum channel is assumed to be unity and the azimuth, the Q and the elevation channel have output signals represented by l, m, and n, respectively. The values of l, m and n are in general complex and are assumed to be small compared to unity.

If a target, T, is at an azimuth angle e and an elevation angle $\phi$, then monopulse ratios can be derived and for an ideal system without errors, the ratios are $\tan \theta$ and $\tan \phi$, respectively. In a non-ideal system with errors, the monopulse ratios become complex. Typically, known monopulse receivers are modeled using the real part as the monopulse ratio and the imaginary part is discarded. Thus, errors represented in the imaginary part are ignored in known monopulse receivers, reducing the accuracy of the monopulse receiver.

If the target, T, is at a position e in azimuth and c in elevation, then the signal from quadrant A is proportional to $e^{j\theta}e^{j\phi}$, the signal from quadrant B is proportional to $e^{-j\theta} e^{j\phi}$, the signal from quadrant C is proportional to $e^{-j\theta} e^{-j\phi}$, and the signal from quadrant D is proportional to $e^{-j\theta} e^{-j\phi}$. Thus the signal in the sum beam is represented by;

$$A\, e^{j\theta}e^{j\phi} + B\, e^{-j\theta}e^{j\phi} + C\, e^{-j\theta}e^{-j\phi} + D\, e^{je}e^{-j\phi}$$

which can be written as:
$$(A+B+C+D)\cos\theta\cos\phi + j(A-B-C+D)\sin\theta\cos\theta$$

$$+j(A+B-C-D)\cos\theta\sin\phi-(A-B+C-D)\sin\theta\sin\phi$$

or using the expressions unity, l, m and n to represent the respective signals as described above, $$\cos\theta\cos\phi+jl\sin\theta\cos\phi+jn\cos\theta\sin\phi-m\sin\theta\sin\phi.$$

Similarly, the signal from combining quadrants $(A+D)-(B+C)$ is represented by:

$$l\cos\theta\cos\phi+j\sin\theta\cos\phi+jm\cos\theta\sin\phi-n\sin\theta\sin\phi.$$

If the azimuth difference signal is chosen to be $(-j)$ times this quantity, the azimuth difference signal is represented by:

$$-jl\cos\theta\cos\phi+\sin\theta\cos\phi+m\cos\theta\sin\phi+jn\sin\theta\sin\phi.$$

Likewise, the elevation difference signal can be represented by:

$$-jn\cos\theta\cos\phi+m\sin\theta\cos\phi+\cos\theta\sin\phi+jl\sin\theta\sin\phi.$$

When normal processing is used, meaning a separate azimuth channel and elevation channel are used, an azimuth channel, ignoring all terms except the first because in general $\theta$ and $\phi$ are small angles and l, m and n are small compared to unity, produces a $\Delta/\Sigma$ ratio represented by:

$$-jl+\tan\theta+m\tan\phi+j(n-n^*)\tan\phi-jl^*\tan^2\theta-m^*\tan^2\theta\tan\phi$$

where the * denotes the complex conjugate of the corresponding quantity.

In known monopulse receivers, the monopulse ratio is usually taken to be the real part of this quantity:

$$l_2+\tan\theta+m_1\tan\phi-2n_2\tan\theta\tan\phi-l_2\tan^2\theta-m_1\tan^2\theta\tan\phi$$

which equals:

$$(1-2n\tan\phi)\tan\theta+(l_2+m_1\tan\phi)(1-\tan^2\theta) \quad \text{(Eq. 1a)}$$

where $l_1$, $m_1$, and $n_1$ are the real parts and $l_2$, $m_2$ and $n_2$ are the imaginary parts of the complex quantities l, m, and n.

The imaginary part which is discarded is represented by:

$$(m_2\tan\phi-l_1)(1+\tan^2\phi). \quad \text{(Eq. 1b)}$$

Likewise, an elevation channel produces a real part of the monopulse ratio represented by:

$$(1-2l_2\tan\theta)\tan\phi+(n_2+m_1\tan\theta)(1-\tan^2\phi). \quad \text{(Eq. 2a)}$$

and an imaginary part represented by:

$$(m_2\tan\theta-n_1)(1+\tan^2\phi). \quad \text{(Eq. 2b)}$$

When using a two-channel monopulse receiver, the azimuth and elevation signals are typically phase multiplexed in quadrature on to a single channel for amplification, and the real and imaginary parts are separated at the output. Thus, the combined difference signal $(y+jp)$, where y is the azimuth difference signal and p is the elevation difference signal, is represented by:

$$[-jl\cos\theta\cos\phi+\sin\theta\cos\phi+m\cos\theta\sin\phi+jn\sin\theta\sin\phi]+j[-jn\cos\theta\cos\phi+m\sin\theta\cos\phi+\cos\theta\sin\phi+jl\sin\theta\sin\phi].$$

By forming the product of the combined difference signal and the conjugate of the sum signal, ignoring second order error terms, and dividing by the sum beam power, after collecting terms the real part of the composite monopulse ratio giving the azimuth term is represented by:

$$(n_1+l_2)+(1-m_2)\tan\theta+m_1\tan\phi-2n_2\tan\theta\tan\phi-l_2\tan^2\theta-m_1\tan^2\theta\tan\phi+n_1\tan^2\phi-m_2\tan\theta\tan^2\phi,$$

which can be written as:

$$(1-2n_2\tan\phi)\tan\theta+(l_2+m_1\tan\phi)(1-\tan^2\theta)+(n_1-m_2\tan\theta)(1+\tan^2\phi) \quad \text{(Eq. 3)}$$

and the imaginary part of the composite monopulse ratio giving the elevation term is:

$$(n_2-l_1)+m_1\tan\theta+(1+m_2)\tan\phi-2l_2\tan\theta\tan\phi-l_1\tan^2\theta+m_2\tan^2\theta\tan\phi-n_2\tan^2\phi-m_1\tan\theta\tan^2\phi,$$

which can be written as:

$$(1-2l_2\tan\theta)\tan\phi+(n_2+m_1\tan\theta)(1-\tan^2\phi)+(m_2\tan\phi-l_1)(1+\tan^2\theta) \quad \text{(Eq. 4)}$$

It should be appreciated that the first two terms of Equation 3 are identical to Equation 1a, while the third term of Equation 3 is equal to the term of the discarded imaginary part of the elevation channel, Equation 2b. Also, the first two terms of Equation 4 are identical to Equation 2a, while the third of Equation 4 is equal to the term of the discarded imaginary part of the azimuth channel, Equation 1b.

Note that the expressions of Equations 1a and 2a are easily derived from Equations 3 and 4, respectively, by setting $l_2=m_2=n_2=0$, when the errors are pure real, and the expressions of Equation 1b and 2b are derived from Equations 3 and 4, respectively, by setting $l_1=m_1=n_1=0$, when the errors are pure imaginary.

The latter analysis was done when the combined difference signal was represented by azimuth plus j times elevation. Now if we let the combined difference signal be represented by azimuth minus j times elevation, the combined difference signal is represented by:

$$-(n+jl)\cos\theta\cos\phi+(1-jm)\sin\theta\cos\phi+(m-jl)\cos\theta\sin\phi+(1+jn)\sin\theta\sin\phi.$$

As before, by forming the product of the combined difference signal with the conjugate of the sum signal, ignoring second order error terms, dividing by the sum power and collecting terms, the real part of the composite monopulse ratio giving the azimuth term is represented by:

$$-n_1+l_2+(1+m_2)\tan\theta+(m_1\tan\phi)-2n_2\tan\Theta\tan\phi-l_2\tan^2\theta-m_1\tan^2\theta\tan\phi-n_1\tan^2\phi+m_2\tan\theta\tan^2\phi$$

which can be written as:

$$(1-2n_2 \tan\phi)\tan\theta + (l_2+m_1 \tan\phi)(1-\tan^2\theta) \\ -(n_1-m_2\tan\theta)(1+\tan^2\phi) \quad \text{(Eq. 5)}$$

and the negative of the imaginary part of the composite monopulse ratio giving the elevation term is:

$$n_2+l_1+m_1\tan\theta+(1-m_2)\tan\phi-2\ l_2\tan\theta\tan\phi+l_1 \\ \tan^2\theta-m_2\tan^2\theta\tan\phi-n_2\tan^2\phi-m_1\tan\theta\tan^2\phi$$

which can be written as:

$$(1-2l_2\tan\theta)\tan\phi+(n_2+m_1\tan\theta)(1-\tan^2\phi)-(m_2 \\ \tan\phi-l_1)(1+\tan^2\theta). \quad \text{(Eq. 6)}$$

Again, it should be appreciated that the first two terms of Equation 5 are identical to Equation 1a while the third term of Equation 5 is equal to the negative of the term of the discarded imaginary part of the elevation channel, Equation 2b. Also, the first two terms of Equation are identical to Equation 2a while the third term of discarded imaginary part of the azimuth channel, Equation 1b.

It should now be apparent, when using a monopulse receiver which is multiplexing the azimuth difference signal with the elevation difference signal, if the composite difference signal is formed by, alternatively, adding and then subtracting the elevation difference signal with the azimuth difference signal and averaging the result, the errors are reduced. Since the third terms of Equations 3 and 5 cancel each other out and the third terms of Equations 4 and 6 cancel each other out, monopulse ratio terms are produced as that which are obtained when the azimuth difference signal and the elevation difference signal are processed separately.

It should now be apparent to one of skill in the art that the combined difference signal described as $(y+jp)$ and the analysis that followed may be changed so that the signal is described by $(p+jy)$ or $(p-jy)$ or $(y-jp)$.

Referring now again to FIG. 1, the monopulse sum signal, S(RF), after passing through the circulator 13, is converted by a first detector matrix 19 to a sum signal S at any convenient intermediate frequency. The elevation difference signal, jp(RF), is passed through an imbalance correction circuit 10 wherein: (a) the phase of the elevation difference signal jp(RF) is rotated by 90° into phase with the monopulse sum signal S(RF) to form an elevation difference signal, p(RF); and (b) the elevation difference signal p(RF) and the azimuth difference signal jy(RF), at a first interval of time, are combined to form a first composite signal at RF defined by $(p+jy)$ RF and at a second interval of time are combined to form a second composite signal at RF defined by $(p-jy)$ RF. As described further hereinafter, the first composite signal $(p+jy)$RF and the second composite signal $(p-jy)$RF are alternately formed and provided at an output of the imbalance correction circuit 10 as a composite difference signal, (D) RF.

The composite difference signal (D) RF then is converted from RF to a composite difference signal D at any convenient I.F. frequency. Here downconversion of the monopulse sum signal S(RF) and of the composite difference signal (D) RF is accomplished in the first detector matrix 19 of conventional construction. Such matrix may, for example, include: (a) a sum mixer (not shown) to which the monopulse sum signal S(RF) and a reference signal from a first local oscillator (not shown) are applied; (b) a difference mixer (not shown) to which the composite difference signal (D) RF and the reference signal are applied; and (c) appropriate filters.

The sum signal S and the composite difference signal D are passed through a combiner 21 to form the composite signals [S+D] and [S−D]. The combiner 21 may consist of a magic tee or of: (a) an adder (not shown), i.e. a summing amplifier, to which the sum signal S and the composite difference signal D are applied to obtain the composite signal [S+D]; and (b) a subtractor (not shown) i.e., a differential amplifier, to obtain the composite signal [S−D]. The composite signal [S+D] is applied to an amplifier channel 25A and simultaneously, the composite signal [S−D] is applied to amplifier channel 25B.

The outputs of the amplifier channels 25A, 25B are connected to a second detector matrix 27. Such matrix is conventional, being made up of a first mixer (not shown) to which the output of amplifier channel 25A is connected and a second mixer (not shown) to which the output of amplifier channel 25B is connected, with a common reference signal from a second local oscillator (not shown) being connected to both the first and the second mixer. The signals out of the second detector matrix 27 are baseband signals.

Figure 6:
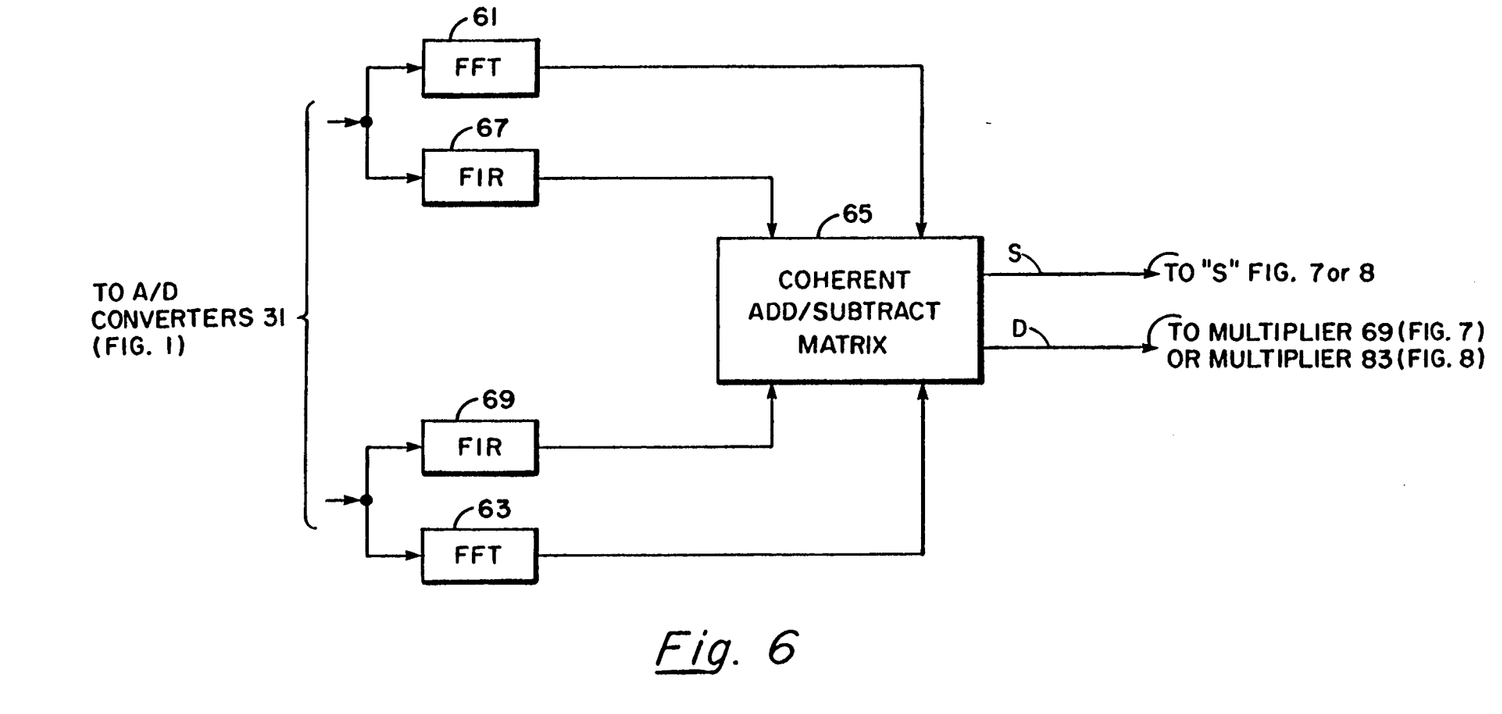
FIG. 6 is a functional block diagram illustrating how signals of the receiver shown in FIG. 1 may be processed.

The signals out of the second detector matrix 27 are connected to analog-to-digital converters (A/D converters 31) wherein the analog signals on such lines are changed in a conventional manner to digital signals. The outputs of the A/D converters 31 are fed to a computer 33 wherein processing is effected in any desired manner to derive the desired elevation and azimuth error signals to actuate a utilization device 35. The latter may, for example, be a conventional autopilot (not shown) to control the trajectory of a guided missile (not shown) and a conventional antenna position controller (not shown) to maintain the orientation of the monopulse antenna 15 with respect to a target T (FIG. 2) Exemplary processing procedures carried out in the computer 33 are described hereinafter in connection with FIGS. 6, 7 and 8.

Figure 3:
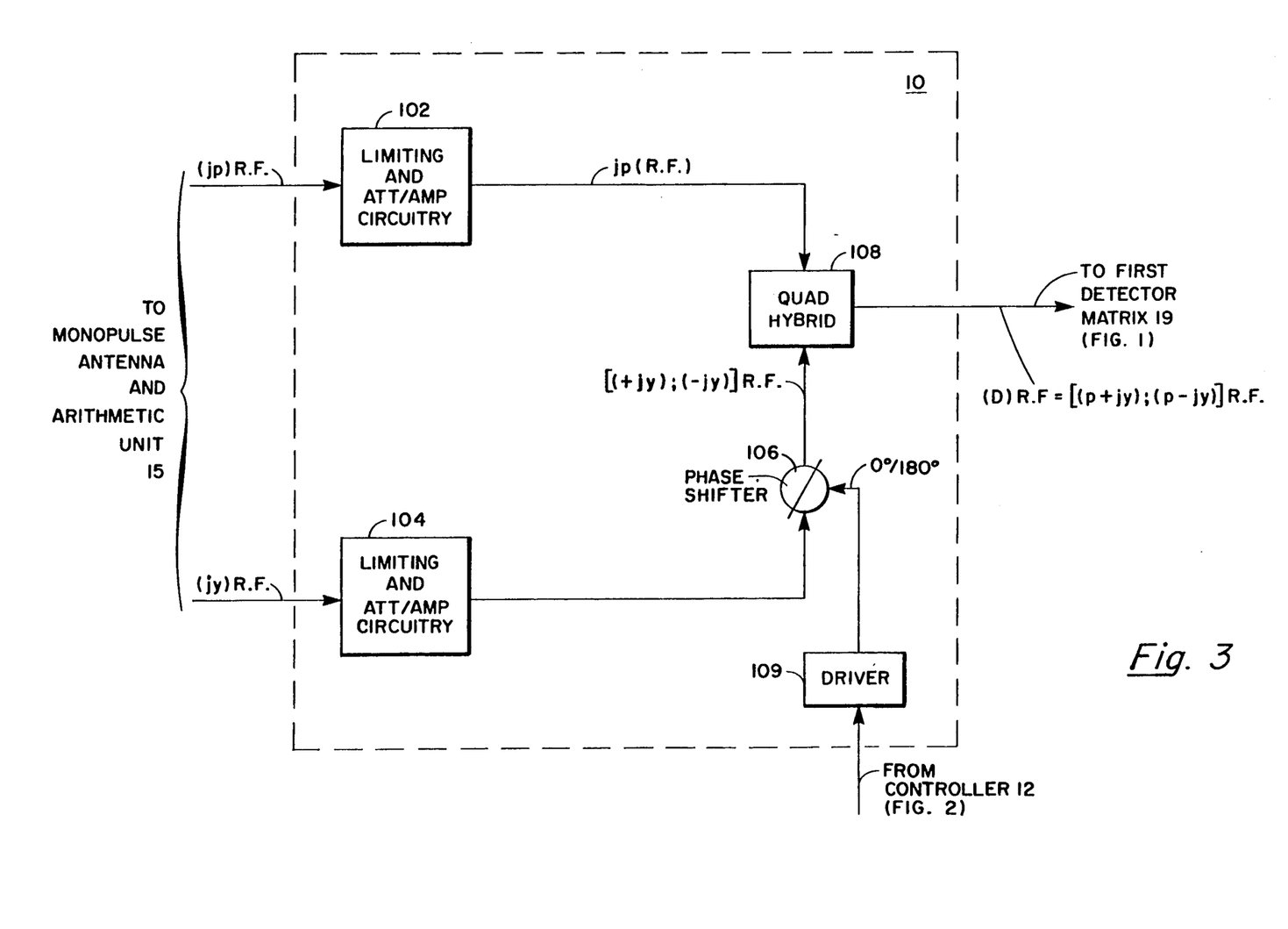
FIG. 3 is a functional block diagram of an imbalance correction circuit of FIG. 1.

Referring now to FIG. 3, the imbalance correction circuit 10 is shown to include a first and a second input port from which the elevation difference signal (jp) RF and the azimuth difference signal (jy) RF, respectively, are fed to the imbalance correction circuit 10 from the monopulse antenna and arithmetic unit 15 (FIG. 1). The elevation difference signal (jp) RF is fed to limiting and attenuation/amplification circuitry 102 where the elevation difference signal (jp)RF is conditioned to an appropriate signal level before being fed to a first input port of a quadrature hybrid 108. The azimuth difference signal (jy) RF is fed to limiting and attenuation/amplification circuitry 104 where the azimuth difference signal (jy) RF is conditioned to an appropriate signal level before being fed to phase shifter 106. The phase shifter 106 is arranged, so that in response to a control signal from a driver 109, the phase of an input signal, here the azimuth difference signal (jy) RF, is either unaffected, i.e., shifted by 0° or reversed, i.e., shifted by 180° at the output port thereof. The phase shifter 106 is activated by driver 109 so that in successively occurring intervals, the phase of the azimuth difference signal (jy) RF is unaffected during a first interval, shifted by 180° during a second interval following the first interval, unaffected during a successive occurring interval following the second interval, shifted by 180° during a following successive occurring interval and so on. The driver 109 in turn is actuated by successively occurring signals from the controller 12 (FIG. 1) that indicate the beginning of each successive interval. The signal at the output port of the phase shifter 106 is fed to a second input port of the quadrature hybrid 108.

The quadrature hybrid 108 is arranged so that a signal fed to the first input port thereof is combined with a signal fed to the second input port thereof to produce a combined signal at an output port, the combined signal including the signal fed to the first input port shifted by 90° combined with the signal fed to the second input port. Thus, during the first interval of time, the elevation difference signal (jp) RF at the first input port is shifted by 90° to produce an elevation difference signal (p) RF, which is combined with the azimuth difference signal (jy) RF to produce a first composite signal (p+jy). During the second interval of time, the elevation difference signal (jp) RF at the first input port is shifted by 90° to produce an elevation difference signal (p) RF, which is combined with the azimuth difference signal (−jy) RF to produce a second composite signal (p−jy). At a successive occurring interval of time, the first composite signal is produced, at a following successive occurring interval of time the second composite signal is produced and so on, hence a composite difference signal (D) RF is produced at the output port of the quadrature hybrid 108, which is fed to the first detector matrix 19 (FIG. 1) as described hereinbefore.

It will now be appreciated that the effect of any imbalance due to the monopulse antenna and arithmetic unit 15 shows up in the amplitude and phase of successive digital signals out of the A/D converters 31. However, any one of several methods of equalization may be followed, in combination with normal monopulse angle error processing. Thus, if post detection integration (PDI) is used, digital signals in any even number of successive intervals may be averaged using either batch or pipeline processing. Thus, referring now to FIG. 6, digital signals derived from amplifier channel 25A (FIG. 1) may be applied to a fast Fourier transform, FFT 61, and digital signals derived from amplifier channel 25B (FIG. 1) may be applied to a fast Fourier transform (FFT 63) that is similar to FFT 61 for processing. After completion of processing in FFT 61, 63 corresponding outputs of FFT 61, 63 are added and subtracted in a coherent ADD/SUBTRACT matrix 65. Alternatively, to perform pipeline processing, successive digital numbers are impressed on finite impulse filters (FIR 67, FIR 69) and corresponding outputs of such filters are added and subtracted in the coherent ADD/SUBTRACT matrix 65. In either case, any effect of imbalance due to the monopulse antenna and arithmetic unit 15 or errors introduced by the multiplexing circuitry associated with the imbalance correction circuitry 10 is substantially eliminated from the outputs of the coherent ADD/SUBTRACT matrix 65.

Figure 7:
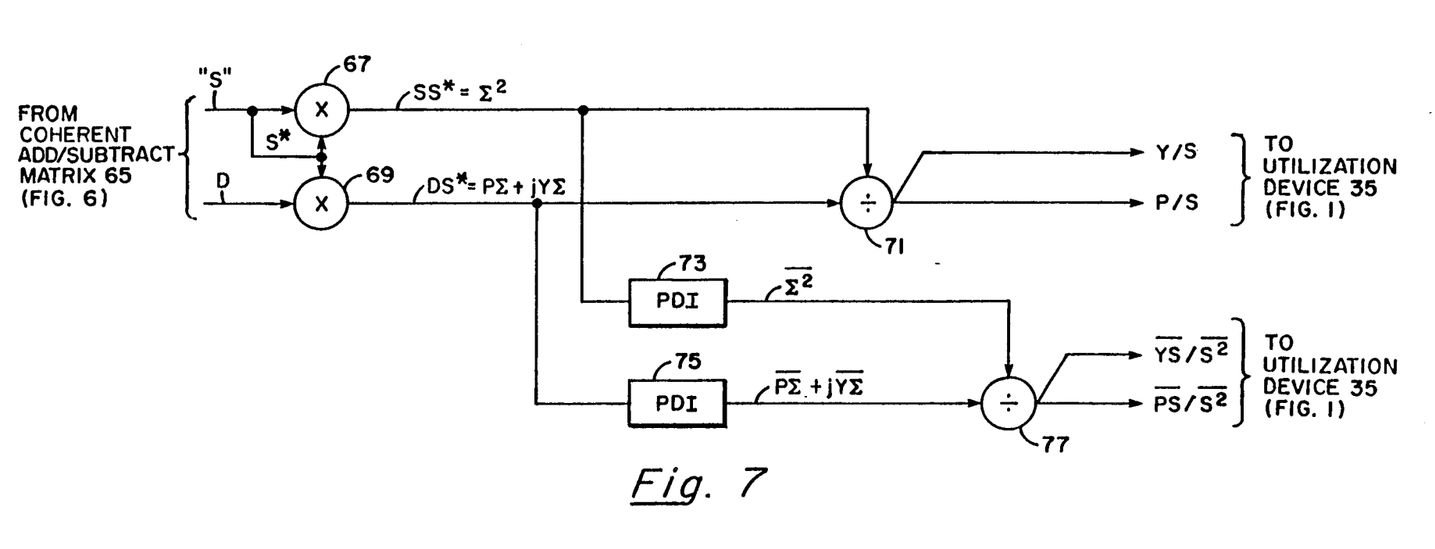
FIG. 7 and 8 are functional block diagrams illustrating various ways in which signals out of the receiver shown in FIG. 4 may be processed.
Figure 8:
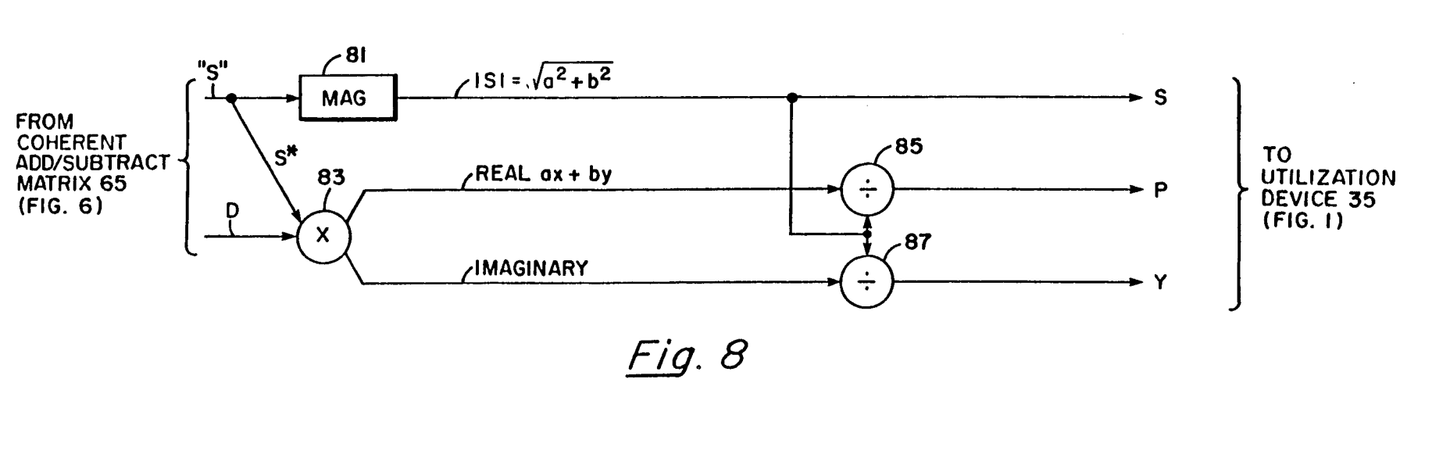

Various optional methods of processing the outputs of the coherent ADD/SUBTRACT matrix 65 are shown in FIGS. 7 and 8. Thus, if monopulse ratios are to be derived, each input of the coherent ADD/SUBTRACT matrix is multiplied (in multipliers 67, 69) by the complex conjugate of the sum signal S* out of such matrix and the output of the multiplier 69 is divided (in divider 71) by the output of the multiplier 67. Alternatively, integration (in PDI 73 and PID 75) of the outputs of the multipliers 67, 69 may be accomplished before division (in divider 77) to derive elevation and azimuth monopulse ratio estimates.

If sum, elevation error and azimuth error signals are required separately, then the magnitude of the sum signal is first found in either a "look up table" or by extracting, in element 81, square root of the product of the sum signal out of the coherent ADD/SUBTRACT matrix 65. The values of the monopulse elevation error, p, and the monopulse azimuth error y are then derived as shown by operation of multiplier 85 and dividers 85, 87.

Figure 4:
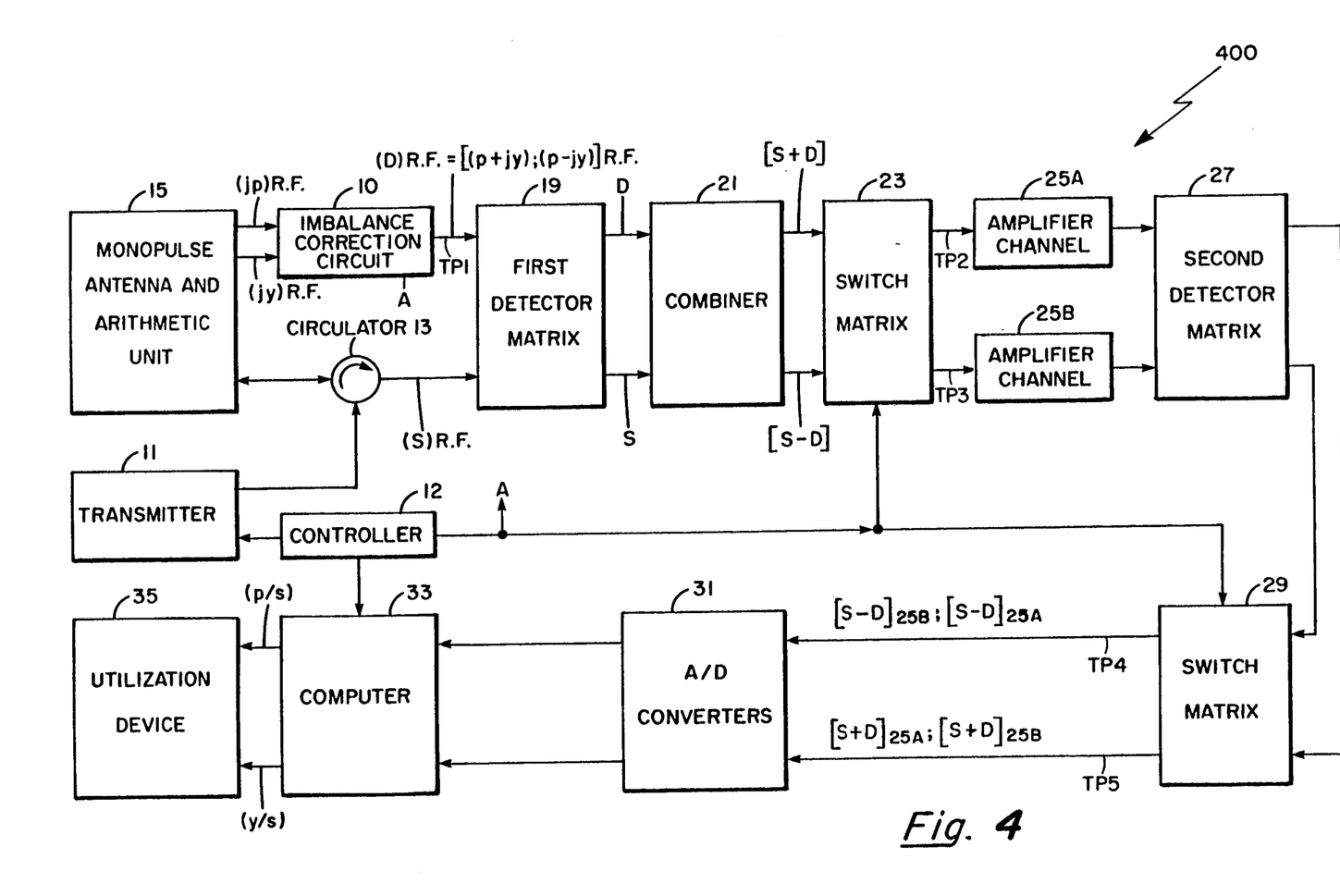
FIG. 4 is a generalized block diagram of an alternative embodiment of a pulse radar incorporating the invention.

Referring now to FIG. 4, a monopulse receiver 400, here an alternative embodiment of a two-channel monopulse receiver, using the teachings as described in patent application, Ser. No. 382,971 entitled "Monopulse Tracking Apparatus and Method of Operating Same" and according to this invention is shown. Thus, a transmitter 11 (actuated in response to a trigger signal from a controller 12) is connected, via a circulator 13, to a monopulse antenna and arithmetic unit 15. The just-mentioned elements are conventional in construction to produce, in the monopulse antenna and arithmetic unit 15, a sum beam (not shown) of radio frequency energy, such beam here having a boresight line (FIG. 2) orthogonal to the aperture of the monopulse antenna. As described hereinbefore in reference to FIG. 1, a monopulse sum signal, S(RF), an elevation difference signal, jp(RF) and an azimuth difference signal, jy(RF), are derived from a single target and appear at the various output ports of the illustrated monopulse antenna and arithmetic unit 15.

The monopulse signal, S(RF), after passing through the circulator 13, is converted by a first detector matrix 19 to a sum signal S at any convenient intermediate frequency. The elevation difference signal, jp(RF), is passed through an imbalance correction circuit 10 wherein: (a) the phase of the elevation difference signal jp(RF); is rotated by 90° into phase with the monopulse sum signal S(RF) to form an elevation difference signal, p(RF); and (b) the elevation difference signal p(RF) and the azimuth difference signal jy(RF), at a first interval of time, are combined to form a first composite signal at RF defined by (p+jy) RF and at a second interval of time are combined to form a second composite signal at RF defined by (p−jy) RF. As described hereinbefore in reference to FIG. 1 and FIG. 3, the first composite signal (p+jy)RF and the second composite signal (p−jy)RF are alternately formed and provided at an output of the imbalance correction circuit 10 as a composite difference signal, (D) RF. The composite difference signal (D) RF then is converted from RF to a composite difference signal D at any convenient I.F. frequency. Here downconversion of the monopulse sum signal S(RF) and of the composite difference signal (D) RF is accomplished in the first detector matrix 19 of conventional construction.

The sum signal S and the composite difference signal D are passed through a combiner 21 to form the composite signals [S+D] and [S−D]. The composite signal [S+D] is sequentially applied, through a switch matrix 23, to an amplifier channel 25A and an amplifier channel 25B and, simultaneously, the composite signal [S−D] is sequentially applied through the switch matrix 23 to the amplifier channel 25B and to the amplifier channel 25A. The switch matrix 23 is operative in a manner similar to the way in which a double-pole double-throw switch operates. That is to say, whenever the composite signal [S+D] is applied to the amplifier channel 25A, the composite signal [S−D] is applied to the amplifier channel 25B, and vice versa.

The outputs of the amplifier channels 25A, 25B are connected to a second detector matrix 27. Such matrix is conventional, being made up of a first mixer (not shown) to which the output of amplifier channel 25A is connected and a second mixer (not shown) to which the output of amplifier channel 25B is connected, with a common reference signal from a second local oscillator (not shown) being connected to both the first and the second mixer. The signals out of the second detector matrix 27 are baseband signals as indicated in Table I.

TABLE I

|  | ODD INTERVALS | EVEN INTERVALS |
| --- | --- | --- |
| First Mixer | [S + D] 25A | [S − D] 25A |
| Second Mixer | [S − D] 26B | [S + D] 25B | where the subscripts 25A, 25B indicate outputs of amplifier channels 25A, 25B. It will be noted that, even though the magnitude of the composite difference signal D is almost always very much smaller than the magnitude of the sum signal S, imbalances in phase or amplitude between the amplifiers 25A, 25B introduce errors in composite signals [S+D] 25A; [S+D] 25B; [S−D] 25A; [S−D] 25B.

The signals out of the second detector matrix 27 are connected to a switch matrix 29 (which switch operates to demultiplex the composite signals out of the second detector matrix 27). That is to say, switch matrix 29 is operative to cause the composite signals [S+D] 25A and [S+D] 25B to appear in successive intervals on one line, TP5, out of the switch matrix 29 and, simultaneously, to cause the composite signals [S−D] 25B and [S−D] 25A to appear on a second line, TP 4, out of the switch matrix 29.

The signals out of the second detector matrix 27 are connected to analog-to-digital converters (A/D converters 31) wherein the analog signals on such lines are changed in a conventional manner to digital signals. The outputs of the A/D converters 31 are fed to a computer 33 wherein processing is effected in any desired manner to derive the desired elevation and azimuth errors signals to actuate a utilization device 35. The latter, may, for example, be a conventional autopilot (not shown) to control the trajectory of a guided missile (not shown) and a conventional antenna position controller (not shown) to maintain the orientation of the monopulse antenna 15 with respect to a target T (FIG. 2).

Figure 5:
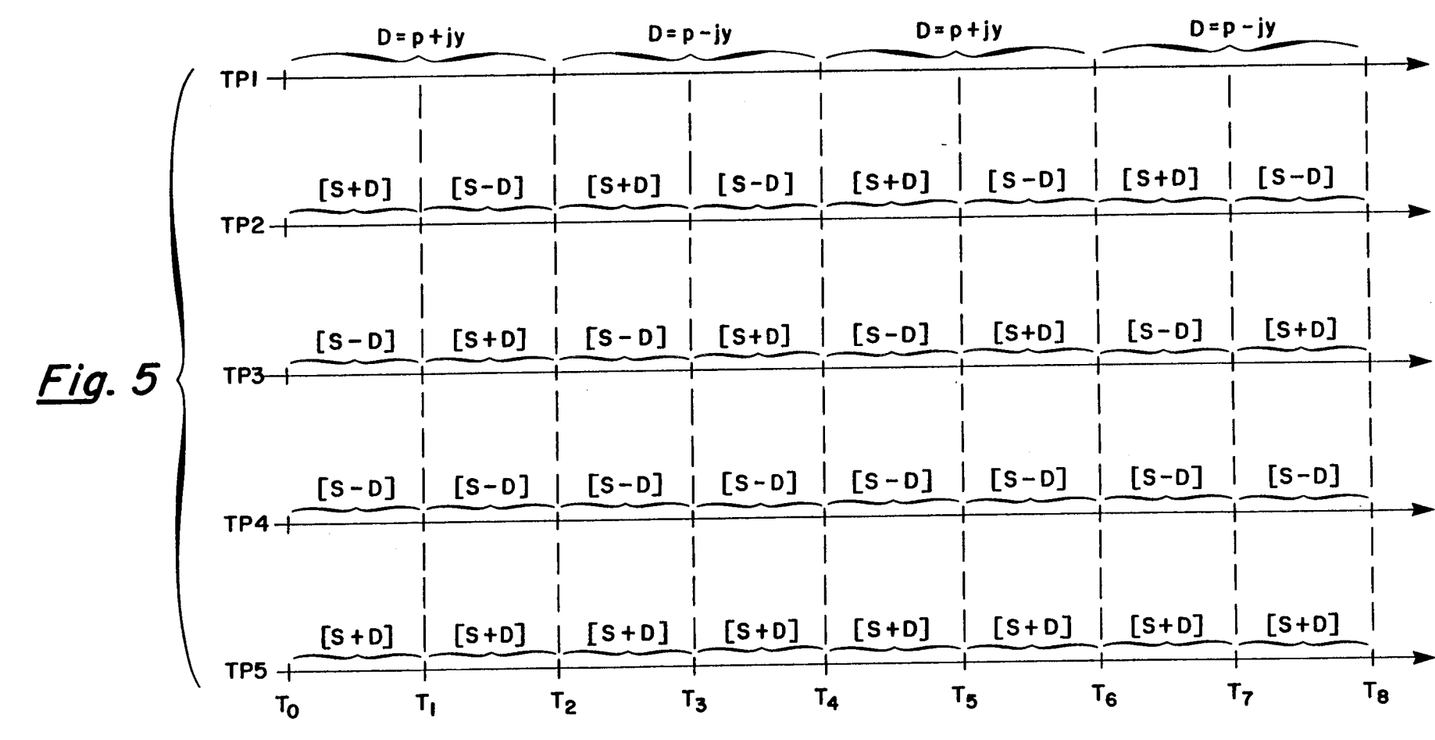
FIG. 5 is a timing diagram showing various multiplexing signals in the receiver shown in FIG. 4.

Referring now also to FIGS. 4 and 5, a timing diagram of various composite signals are shown. Thus, it can be seen that for a first interval of time from $T_0$ to $T_2$, the composite difference signal D at the output, TPI, of the imbalance correction circuit 10 is equal to the first composite signal (p+jy) and for a second interval of time from $T_2$ to $T_4$, the composite difference signal D at the output, TP1, of the imbalance correction circuit 10 is equal to the second composite signal (p−jy). During a following interval of time from $T_4$ to $T_6$, the first composite signal (p+jy) is provided at the output, TP1, and from an interval of time from $T_6$ to $T_8$, the second composite signal (p−jy) is provided at the output, TP1, with successive occurring first and second composite signal portions of the composite difference signal D appearing at the output TP1.

With the foregoing in mind, at the input, TP2, of the amplifier channel 25A, during a third interval of time from $T_0$ to $T_1$, a third composite signal [S+D] is provided and during a fourth interval of time from $T_1$ to $T_2$, a fourth composite signal [S−D] is provided. It should be apparent that the third interval of time being successively followed by the fourth interval of time is a duration equal to the first interval of time. Thus, during the third and fourth intervals of time, the composite difference signal D is equal to the first composite signal (p+jy).

Simultaneously, at the input, TP3, of the amplifier channel 25B, during the third interval of time, the fourth composite signal [S−D] is provided and during the fourth interval of time, the third composite signal [S+D] is provided. Also during the third and fourth interval of time, from $T_0$ to $T_1$ and $T_1$ to $T_2$, respectively, at the output, TP4, of the switch matrix 29, the fourth composite signal [S−D] is provided, while simultaneously, during the third and fourth interval of time, at the output, TP5, of the switch matrix 29, the third composite signal [S+D] is provided. As stated hereinbefore, during the third and fourth interval of time, the composite difference signal D is equal to the first composite signal (p+jy).

During a fifth interval of time from $T_2$ to $T_3$, at the input, TP2, of the amplifier channel 25A, the third composite signal [S+D] is provided and during a sixth interval of time from $T_3$ to $T_4$, the fourth composite signal [S−D] is provided. It should be apparent that the fifth interval of time being successively followed by the sixth interval of time is of a duration equal to the second interval of time thus the composite difference signal D is equal to the second composite signal (p−jy). Simultaneously, at the input, TP3, of the amplifier channel 25B, during the fifth interval of time, the fourth composite signal [S−D] is provided and during the sixth interval of time, the third composite signal [S+D] is provided. Likewise during the fifth and sixth intervals of time, at the output, TP4, of the switch matrix 29, the fourth composite signal [S−D] is provided. Simultaneously, during the fifth and sixth intervals of time, at the output, TP5, of the switch matrix 29, the third composite signal [S+D] is provided. During the fifth and sixth intervals of time, the composite difference signal D is equal to the second composite signal (p−jy), thus ending a cycle.

The cycle then repeats with appropriate signals provided during the intervals $T_4$ to $T_5$, $T_5$ to $T_6$, $T_6$ to $T_7$ and $T_7$ to $T_8$ as described during the intervals $T_0$ to $T_1$, $T_1$ to $T_2$, $T_2$ to $T_3$ and $T_3$ to $T_4$, respectively, with successive occurring intervals following.

It will now be appreciated that the effect of any imbalance due to the monopulse antenna and arithmetic unit 15 or between the amplifier channels 25A, 25B shows up in the amplitude and phase of successive digital signals out of the A/D converters 31. However, any one of several methods of equalization may be followed, in combination with normal monopulse angle error processing. Thus, if post detection integration (PDI) is used, digital signals in any even number of successive intervals may be averaged using either batch or pipeline processing. Thus, referring again to FIG. 6, digital signals derived from amplifier channel 25A (FIG. 4) may be applied to a fast Fourier transform, FFT 61, and digital signals derived from amplifier channel 25B (FIG. 4) may be applied to a fast Fourier transform (FFT 63) that is similar FFT 61 for processing. After completion of processing in FFT 61, 63 corresponding outputs of FFT 61, 63 are added and subtracted in a coherent ADD/SUBTRACT matrix 65. Alternatively, to perform pipeline processing, successive digital numbers are impressed on finite impulse filters (FIR 67, FIR 69) and corresponding outputs of such filters are added and subtracted in the coherent ADD/SUBTRACT matrix 65. In either case, any effects of imbalance due to the monopulse antenna and arithmetic unit 15 or between the amplifier channels 25A, 25B is substantially eliminated from the outputs of the coherent ADD-/SUBTRACT matrix 65.

The various optional methods of processing the outputs of the coherent ADD/SUBTRACT matrix 65 as shown hereinbefore with reference to FIGS. 7 and 8 can now be used to develop appropriate signals to control the utilization device 35.

Having described embodiments of this invention, it will now be apparent to one of skill in the art that changes may be made without departing from the concept of: (a) forming an elevation difference signal, p, and an azimuth difference signal, y, (b) forming, during a first interval of time, a first composite signal comprising the elevation difference signal phased multiplexed with the azimuth difference signal and providing said first composite signal to an output terminal, (c) forming, during a second interval of time, following the first interval of time, a second composite signal comprising the elevation difference signal phase multiplexed with the azimuth difference signal delayed in phase by one hundred and eighty degrees and providing said second composite signal to the output terminal, and (d) repeating steps (a), (b) and (c) during successive occurring intervals to provide a composite difference signal. It is felt, therefore, that this invention should not be restricted to the described embodiments, but rather should be limited only by the spirit and scope of the appended claims.

What is claimed is:

1. A method of operating a monopulse receiver comprising the steps of:
   (a) forming an elevation difference signal, p, and an azimuth difference signal, y;
   (b) forming, during a first interval of time, a first composite signal comprising the elevation difference signal phase multiplexed with the azimuth difference signal and providing said first composite signal to an output terminal;
   (c) forming, during a second interval of time following the first interval of time, a second composite signal comprising the elevation difference signal phase multiplexed with the azimuth difference signal delayed in phase by one hundred and eighty degrees and providing said second composite signal to the output terminal; and
   (d) repeating steps (a), (b) and (c) during successively occurring intervals to provide a composite difference signal.

2. The method of operating a monopulse receiver as recited in claim 1 further comprising the steps of:
   (a) averaging an even number of successively occurring first and second composite signal portions of the composite difference signal to provide an averaged composite difference signal; and
   (b) demultiplexing the averaged composite difference signal to derive a signal representative of the elevation difference signal, p, and a signal representative of the azimuth difference signal, y.

3. A method of operating a monopulse receiver comprising the steps of:
   (a) forming an elevation difference signal, p, and an azimuth difference signal, y;
   (b) forming, during a first interval of time, a first composite signal defined as $(p+jy)$ wherein j is an indicator of being in quadrature with the elevation difference signal and providing said first composite signal to an output terminal;
   (c) forming, during a second interval of time following the first interval of time, a second composite signal defined as $(p-jy)$ and providing said second composite signal to the output terminal; and
   (d) repeating steps (a), (b) and (c) during successively occurring intervals to provide a composite difference signal.

4. The method of operating a monopulse receiver as recited in claim 3 further comprising the steps of:
   (a) averaging an even number of successively occurring first and second composite signal portions of the composite difference signal to provide an averaged composite difference signal; and
   (b) demultiplexing the averaged composite difference signal to derive a signal representative of the elevation difference signal, p, and a signal representative of the azimuth difference signal, y.

5. The method of operating a monopulse receiver as recited in claim 3 further comprising the steps of:
   (a) forming a monopulse sum signal, S;
   (b) forming a third composite signal and a fourth composite signal defined as $[S+D]$ and $[S-D]$, respectively, wherein D is the composite difference signal;
   (c) during a third interval of time, passing the third composite signal $[S+D]$ through a first amplifier channel to a first output terminal and, simultaneously, the fourth composite signal $[S-D]$ through a second amplifier channel to a second output terminal; and
   (d) during a fourth interval following the third interval of time, passing the third composite signal $[S+D]$ through the second amplifier channel to the first output terminal and, simultaneously, passing the fourth composite signal $[S-D]$ through the first amplifier channel to the second output terminal.

6. The method of operating a monopulse receiver as recited in claim 5 further comprising the steps of:
   (a) repeating the preceding steps during successively occurring intervals to provide an even number of successively amplified third composite signals $[S+D]$ at the first output terminal and a like even number of successively amplified fourth composite signals $[S-D]$ at the second output terminal; and
   (b) separately averaging each even number of successively amplified third and fourth composite signals $[S+D]$, $[S-D]$.

7. The method of operating a monopulse receiver as recited in claim 6 further comprising the steps of:
   (a) adding the averaged third composite signal $[S+D]$ and the averaged fourth composite signal $[S-D]$ to derive a signal representative of S;
   (b) subtracting the averaged fourth composite signal $[S-D]$ from the averaged fourth composite signal $[S-D]$ to derive a signal representative of D;
   (c) averaging an even number of successively occurring first and second composite signal portions of the composite difference signal D; and
   (d) demultiplexing the composite difference signal, D, to derive a signal representative of the elevation difference signal, p, and the azimuth difference signal, y.

8. The method as recited in claim 7 further comprising the steps of:
   (a) deriving an N-point Fourier transform of all monopulse signals derived during N successive intervals, where N is an even integer; and
   (b) averaging each one of the N points in M successively derived N-point Fourier transformer, where M is an integer.

9. The method as recited in claim 7 further comprising the step of passing all monopulse signals derived in M successive intervals through a finite impulse filter, where M is an even integer.

10. A monopulse receiver comprising:
   (a) means for providing an elevation difference signal, p, and an azimuth difference signal, y;
   (b) means, fed by the elevation difference signal and the azimuth difference signal, for providing a first composite signal defined as (p+jy), and for providing a second composite signal defined as (p−jy), wherein j is an indication of being in quadrature with the elevation difference signal, and for interleaving the first and the second composite signal for providing a composite difference signal.

11. The monopulse receiver as recited in claim 10 further comprising:
   (a) means, fed by the composite difference signal, for averaging an even number of successively occurring first and second composite signal portions of the composite difference signal for providing an averaged composite difference signal; and
   (b) means for demultiplexing the averaged composite difference signal to derive a signal representative of the elevation signal, p, and a signal representative of the azimuth signal, y.

12. The monopulse receiver as recited in claim 10 further comprising:
   (a) means for providing a monopulse sum signal, S; and
   (b) means, fed by the monopulse sum signal and the composite difference signal for providing a third composite signal, [S+D], and a fourth composite signal, [S−D], at a second output thereof wherein D is the composite difference signal.

13. A monopulse receiver comprising:
   (a) means for providing a monopulse sum signal, S, an azimuth signal, y, and an elevation signal, p;
   (b) means, fed by the azimuth difference signal and the elevation difference signal, for providing a first composite signal defined as (y+jp) and a second composite signal defined as (y−jp), wherein j is an indicator of being in quadrature with the monopulse sum signal, and for interleaving the first and the second composite signal for providing a composite difference signal, D;
   (c) means, fed by the monopulse sum signal and the composite difference signal, for providing a third composite signal defined as [S+D] and a fourth composite signal defined as [S−D];
   (d) means, responsive to a first control signal, for feeding the third composite signal to a first amplifier channel and for simultaneously feeding the fourth composite signal to a second amplifier channel during a first interval of time and, alternatively, for feeding the third composite signal to the second amplifier channel and for simultaneously feeding the fourth composite signal to the first amplifier channel during a second interval following the first interval of time, for providing an output signal from each of the first and second amplifier channels; and
   (e) means, responsive to a second control signal and fed by each output signal from the first and second amplifier channels, for providing successively amplified third composite signals [S+D] at a first output line and successively amplified fourth composite signals [S−D] at a second output line.

14. The monopulse receiver as recited in claim 13 further comprising:
   (a) means, fed by the first output line and the second output line, for averaging each even number of successively amplified third composite signals to provide an averaged third composite signal and for averaging each even number of successively amplified fourth composite signals to provide an averaged fourth composite signal;
   (b) means, fed by the averaged third and fourth composite signals, for adding the averaged third composite signal [S+D] and the averaged fourth composite signal [S−D] to derive a signal representative of S and for subtracting the averaged third composite signal [S+D] and the averaged fourth composite signal [S−D] to derive a signal representative of D; and
   (c) means, fed by the signal representative of D, for demultiplexing the signal representative of D to derive a signal representative of the azimuth error, y, and a signal representative of the elevation error, p.

* * * * *